US012680472B2

(12) United States Patent
Meyer

(10) Patent No.: US 12,680,472 B2
(45) Date of Patent: Jul. 14, 2026

(54) STRUT FOR BEARING ASSEMBLY AND METHOD FOR REMOVING STRUT

(71) Applicant: ROLLS-ROYCE plc, London (GB)

(72) Inventor: Richard Meyer, Derby (GB)

(73) Assignee: Rolls-Royce PLC, London (GB)

( * ) Notice: Subject to any disclaimer, the term of this patent is extended or adjusted under 35 U.S.C. 154(b) by 62 days.

(21) Appl. No.: 18/926,479

(22) Filed: Oct. 25, 2024

(65) Prior Publication Data

US 2025/0250909 A1 Aug. 7, 2025

(30) Foreign Application Priority Data

Nov. 10, 2023 (GB) ...................................... 2317247

(51) Int. Cl.
*F01D 25/16* (2006.01)

(52) U.S. Cl.
CPC ........ *F01D 25/162* (2013.01); *F05D 2220/32* (2013.01); *F05D 2230/70* (2013.01); *F05D 2240/50* (2013.01)

(58) Field of Classification Search
CPC ........ F01D 25/16; F01D 25/162; F01D 25/24; F01D 9/00; F01D 9/02; F01D 9/04; F01D 9/041; F01D 9/042; F01D 9/044; F05D 2220/32; F05D 2230/70; F05D 2240/50
See application file for complete search history.

(56) References Cited

U.S. PATENT DOCUMENTS

| | | | | |
|---|---|---|---|---|
| 5,292,227 | A | 3/1994 | Czachor et al. | |
| 11,236,615 | B1 * | 2/2022 | Burton | F04D 29/542 |
| 2004/0240987 | A1 * | 12/2004 | Czachor | F01D 9/065 415/142 |
| 2013/0142631 | A1 | 6/2013 | Pauli et al. | |
| 2017/0130608 | A1 | 5/2017 | Wiebe et al. | |
| 2018/0149085 | A1 * | 5/2018 | Chennoju | F01D 9/065 |
| 2018/0223734 | A1 * | 8/2018 | Hendrickson | F16L 15/006 |
| 2019/0112946 | A1 * | 4/2019 | Matteson | F01D 25/18 |

FOREIGN PATENT DOCUMENTS

EP 3653837 A1 5/2020

OTHER PUBLICATIONS

European search report dated Mar. 10, 2025, issued in EP Patent Application No. 24205728.9.
GB Search Report date Aug. 22, 2024 issued in GB patent application No. 2317247.1.

* cited by examiner

*Primary Examiner* — Elton K Wong

(57) ABSTRACT

A strut for a bearing assembly of a gas turbine engine. The bearing assembly has a first bearing structure and a second bearing structure. The strut includes a first mounting end portion, a second mounting end portion spaced apart from the first mounting end portion, and a shaft portion extending between the first mounting end portion and the second mounting end portion along a longitudinal axis. The first mounting end portion is configured to be attached to the first bearing structure thereby forming an interference fit between the first mounting end portion and the first bearing structure. The second mounting end portion is configured to be attached to the second bearing structure. The first mounting end portion includes at least one relief feature.

11 Claims, 10 Drawing Sheets

STRUT FOR BEARING ASSEMBLY AND METHOD FOR REMOVING STRUT

CROSS-REFERENCE TO RELATED APPLICATIONS

This specification is based upon and claims the benefit of priority from United Kingdom patent application number GB 2317247.1 filed on Nov. 10, 2023, the entire contents of which is incorporated herein by reference.

BACKGROUND

Technical Field

The present disclosure relates to a strut for a bearing assembly of a gas turbine engine. The disclosure further relates to a method for removing a strut from a bearing assembly of a gas turbine engine.

Description of the Related Art

In turbofan aircraft engines, high pressure and intermediate/low pressure turbine loads are generally transmitted to the rest of an engine core structure via a bearing assembly. The bearing assembly is usually located between the high pressure turbine and the low/intermediate pressure turbine. The bearing assembly transmits bearing loads and is therefore, subjected to high loads associated with pressure difference and thermal gradients driven by air and oil system architecture. Conventionally, the bearing assembly includes an inner structure (i.e., a bearing structure) connected to an outer casing through a number of radial struts. The struts are fitted using an interference fit and a retaining pin.

There have been incidents of damage during service to the struts which has led to the entire bearing structure being scrapped. Additionally, the entire bearing structure could be scrapped when the struts are made from a defective material batch. In other words, if a strut is damaged or broken, or if a defective material batch (of strut) is found, the entire bearing structure might have to be scrapped.

Traditionally, various attempts have been made to machine out the damaged/broken strut by gradually grinding away the strut. However, such attempts impose a risk of encroaching onto the bearing structure which would require further repair to restore the bore of the strut. Thus, any machining of the strut may tend to cut into the bearing structure due to similar hardness of the strut and the bearing structure. Therefore, there is a need for an improved strut which can be removed or broken easily without affecting or damaging the surrounding bearing structure. Further, there is a need for a method for removing the strut without affecting or damaging the bearing structure.

SUMMARY

According to a first aspect, a strut for a bearing assembly of a gas turbine engine is disclosed. The bearing assembly has a first bearing structure and a second bearing structure. The strut includes a first mounting end portion, a second mounting end portion spaced apart from the first mounting end portion, and a shaft portion extending between the first mounting end portion and the second mounting end portion along a longitudinal axis. The first mounting end portion is configured to be attached to the first bearing structure of the bearing assembly thereby forming an interference fit between the first mounting end portion and the first bearing structure. The second mounting end portion is configured to be attached to the second bearing structure of the bearing assembly. The first mounting end portion includes at least one relief feature formed therein to facilitate the removal of the first mounting end portion from the first bearing structure and thereafter the removal of the second mounting end portion from the second bearing structure.

The at least one relief feature on the first mounting end portion may enable removal of the strut from the bearing assembly without affecting or damaging the first bearing structure. Specifically, when there is a need to remove a damaged or broken strut from the bearing assembly, the at least one relief feature may allow the damaged or broken strut to be cut and then drilled out without having to encroach on the first bearing structure. In other words, while removing the strut from the bearing assembly by machining, the at least one relief feature may allow the strut to collapse prior to any damage to the first bearing structure. The at least one relief feature may further enhance the machining of the strut in such a way that the strut may be removed easily without risk of damage to the first bearing structure. Therefore, even though a tight interference fit is present between the first mounting end portion and the first bearing structure, the strut of the present disclosure may be removed with ease, when required, without damaging the first bearing structure.

In some embodiments, the first mounting end portion includes an outer surface forming the interference fit with the first bearing structure. The at least one relief feature is disposed on the outer surface. As the at least one relief feature is disposed on the outer surface of the first mounting end portion, the interference fit between the outer surface of the first mounting end portion and the first bearing structure is weakened during the removal of the first mounting end portion from the first bearing structure. This may allow an easy removal of the strut from the bearing assembly without affecting or damaging the first bearing structure.

In some embodiments, a length of the at least one relief feature along the longitudinal axis is substantially equal to a length of the first mounting end portion along the longitudinal axis. Such extension of the at least one relief feature across the length of the first mounting end portion may facilitate the removal of the first mounting end portion from the first bearing structure when there is a need to remove the strut from the bearing assembly.

In some embodiments, the first mounting end portion includes a wall having a wall thickness. The at least one relief feature has a maximum depth perpendicular to the longitudinal axis. The maximum depth is at most two-thirds of the wall thickness of the first mounting end portion. The maximum depth of the at least one relief feature being at most two-thirds (i.e., 66.67%) of the wall thickness may ensure that the at least one relief feature does not affect the interference fit between the between the first mounting end portion and the first bearing structure.

In some embodiments, the at least one relief feature has a curved profile. The curved profile of the at least one relief feature may provide a desirable geometry to the at least one relief feature so as to allow easy removal of the strut from the bearing assembly without affecting or damaging the first bearing structure.

In some embodiments, the curved profile is a circular arc. The circular arc of the curved profile of the at least one relief feature may enhance machining of the strut during removal of the strut from the bearing assembly. The circular arc of the curved profile of the at least one relief feature may be achieved by using a bull nose cutter.

In some embodiments, the at least one relief feature is a single relief feature. The single relief feature may be suitable for applications where the interference fit between the first mounting end portion and the first bearing structure is not very tight or strong.

In some embodiments, the at least one relief feature includes a pair of diametrically opposite relief features. The pair of diametrically opposite relief features may further ease the machining of the strut when the strut is being removed from the bearing assembly. The pair of diametrically opposite relief features may be suitable for applications where the interference fit between the first mounting end portion and the first bearing structure is very tight or strong.

According to a second aspect, a bearing assembly for a gas turbine engine is disclosed. The bearing assembly includes a first bearing structure, a second bearing structure spaced apart from the first bearing structure, and the strut of the first aspect. The first mounting end portion is attached to the first bearing structure thereby forming an interference fit between the first mounting end portion and the first bearing structure. The second mounting end portion is attached to the second bearing structure. Therefore, service and repair of the bearing assembly of the present disclosure may be performed with ease in cases where the strut has to be removed from the bearing assembly.

According to a third aspect, a gas turbine engine including the bearing assembly of the second aspect is disclosed. In such a gas turbine engine, timely maintenance of the bearing assembly may be performed with ease.

According to a fourth aspect, a method for removing the strut of the first aspect is disclosed. The method includes cutting the shaft portion of the strut proximally to the first mounting end portion to form a cut surface of the first mounting end portion. The method further includes drilling a pilot hole located at the radial centre of the cut surface of the first mounting end portion. The method further includes progressively increasing a drill diameter of the pilot hole until the drill diameter of the pilot hole breaks through the at least one relief feature. The method further includes removing the first mounting end portion from the first bearing structure of the bearing assembly.

As the drill diameter of the pilot hole breaks through the at least one relief feature, the first mounting end portion of the strut may be easily removed from the first bearing structure of the bearing assembly. Therefore, the method of the present disclosure provides an easy and efficient technique for removing the first mounting end portion of the strut from the first bearing structure without affecting or damaging the first bearing structure. Further, the method of the fourth aspect of the present disclosure is advantageous due to inclusion of the at least one relief feature on the first mounting end portion of the strut of the first aspect.

In some embodiments, the method further includes removing the second mounting end portion from the second bearing structure after removal of the first mounting end portion from the first bearing structure. Therefore, the method of the fourth aspect of the present disclosure provides an improved technique for easy removal of the strut from the bearing assembly without affecting or damaging the first bearing structure.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or in the order of) any of the following: 110 Nkg-1 s, 105

Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e., the values may form upper or lower bounds), for example in the range of from 80 Nkg-1 s to 100 Nkg-1 s, or 85 Nkg-1 s to 95 Nkg-1 s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying Figures. Further aspects and embodiments will be apparent to those skilled in the art.

Figure 1:
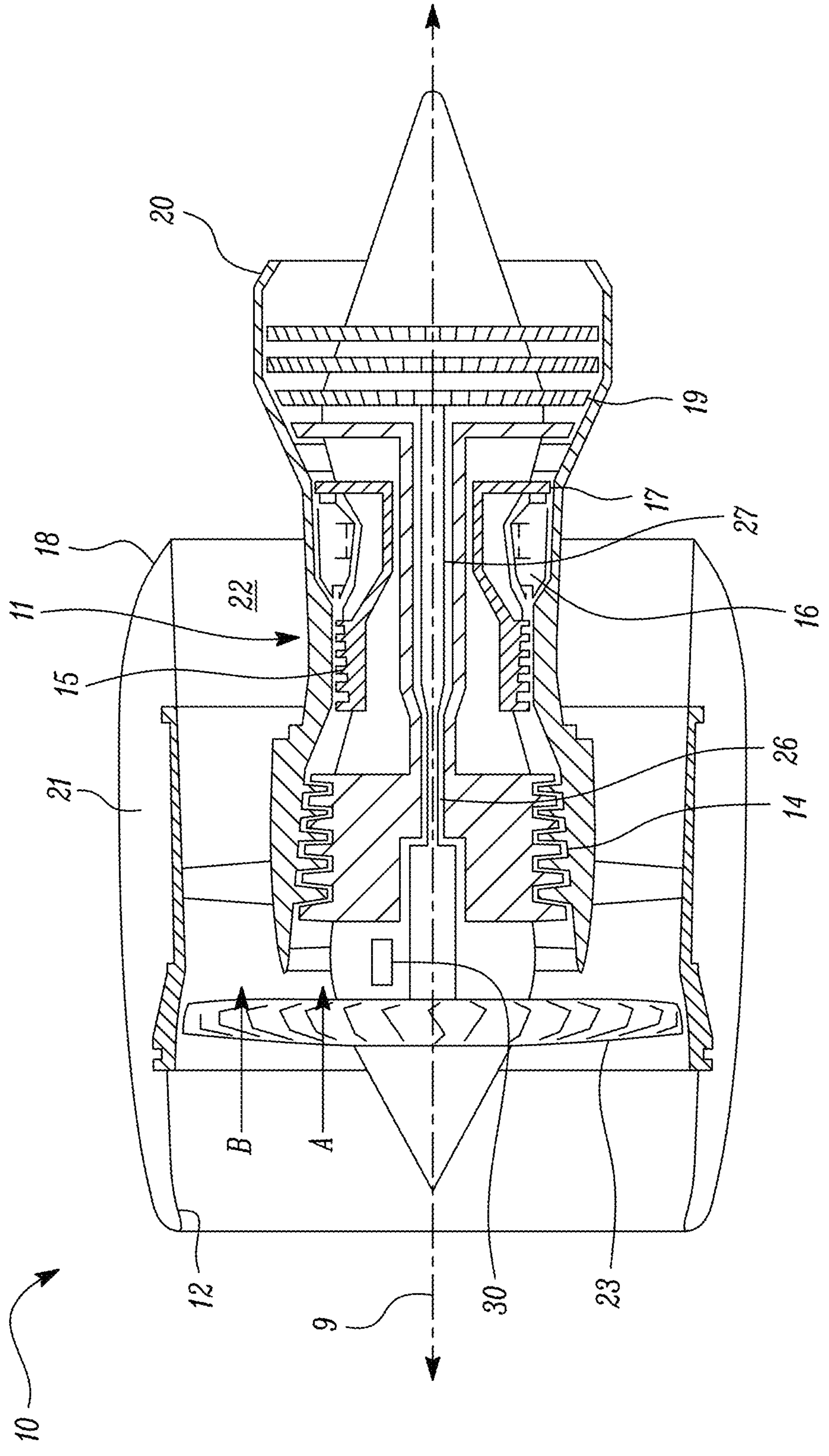
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high pressure compressor 15, a combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine 10 (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

In addition, the present disclosure is equally applicable to aero gas turbine engines, marine gas turbine engines, and land-based gas turbine engines.

Figure 2:
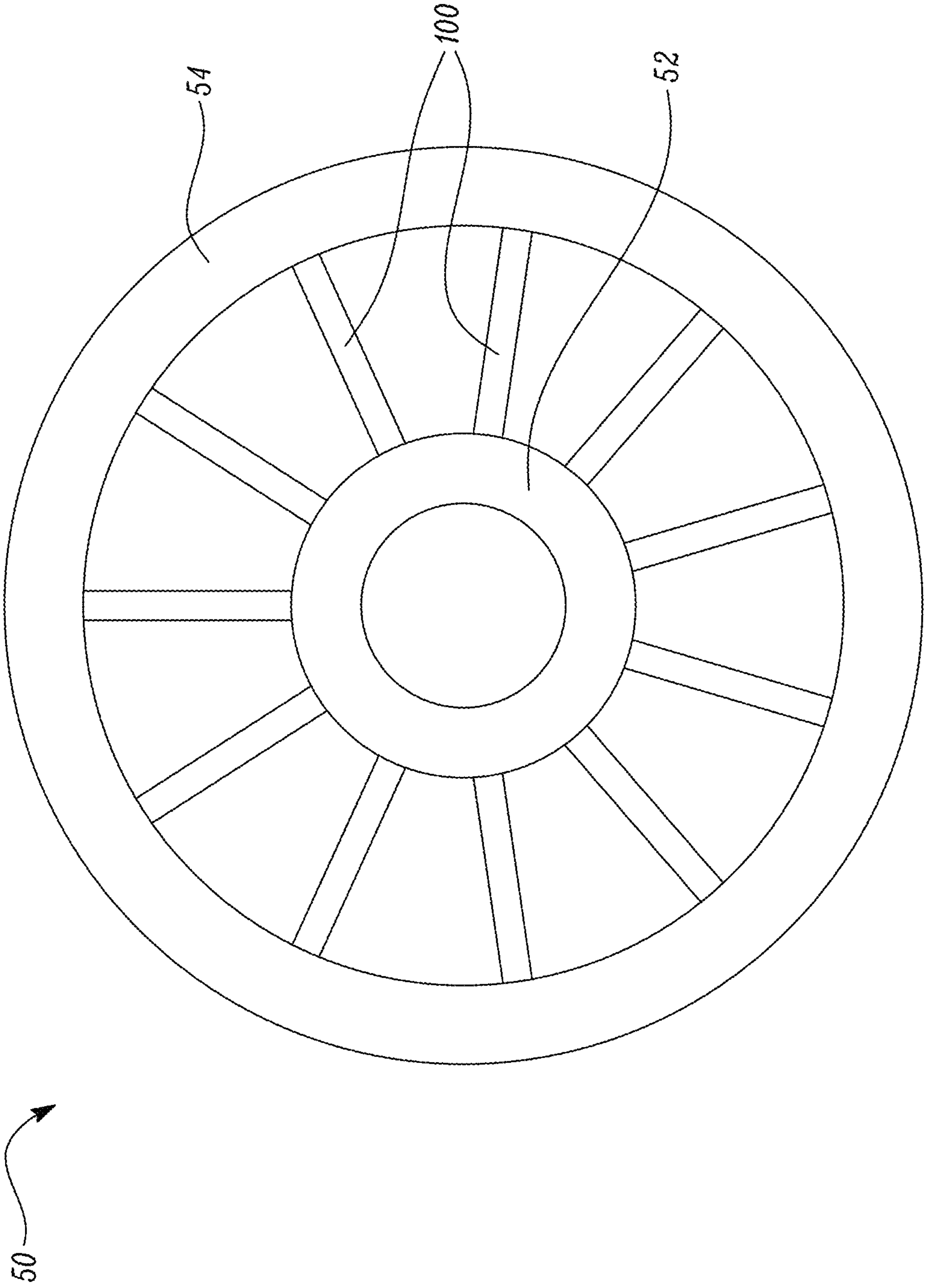
FIG. 2 is a schematic front view of a portion of the gas turbine engine of FIG. 1 comprising a bearing assembly, according to an embodiment of the present disclosure.
Figure 3:
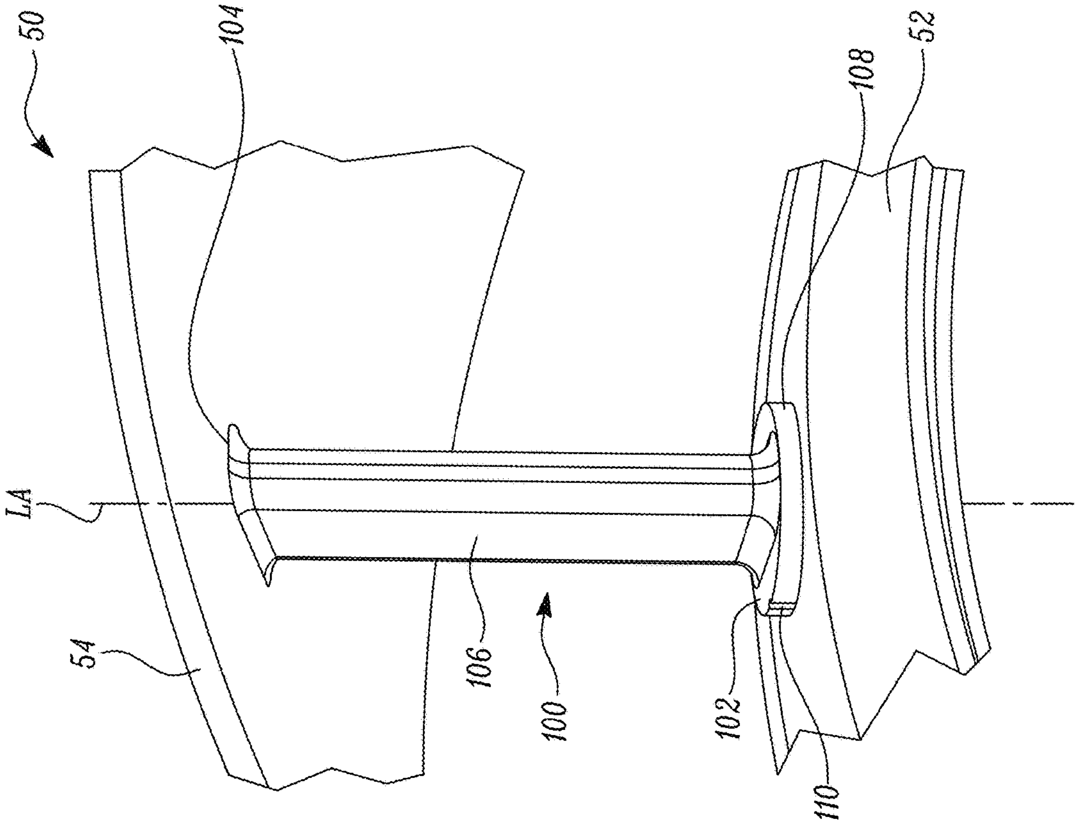
FIG. 3 is a partial perspective side view of the bearing assembly of FIG. 2.

FIG. 2 is a schematic front view of a portion of the gas turbine engine 10 of FIG. 1 comprising a bearing assembly 50, according to an embodiment of the present disclosure. FIG. 3 is a partial perspective side view of the bearing assembly 50. The bearing assembly 50 is secured within the engine core 11 (shown in FIG. 1). The bearing assembly 50 is usually located between the high pressure turbine 17 and the low pressure turbine 19. The bearing assembly 50 transmits bearing loads from the high pressure turbine 17 and the low pressure turbine 19 to the engine core 11.

Referring to FIGS. 2 and 3, the bearing assembly 50 includes a first bearing structure 52 and a second bearing structure 54 spaced apart from the first bearing structure 52. Each of the first bearing structure 52 and the second bearing structure 54 includes one or more bearings (not shown). The bearing assembly 50 further includes a plurality of struts 100 radially disposed between and connecting the first bearing structure 52 and the second bearing structure 54. However, for descriptive and purposes, the bearing assembly 50 will be described hereinafter in greater detail by referring to a single strut 100 for the bearing assembly 50.

Figure 4:
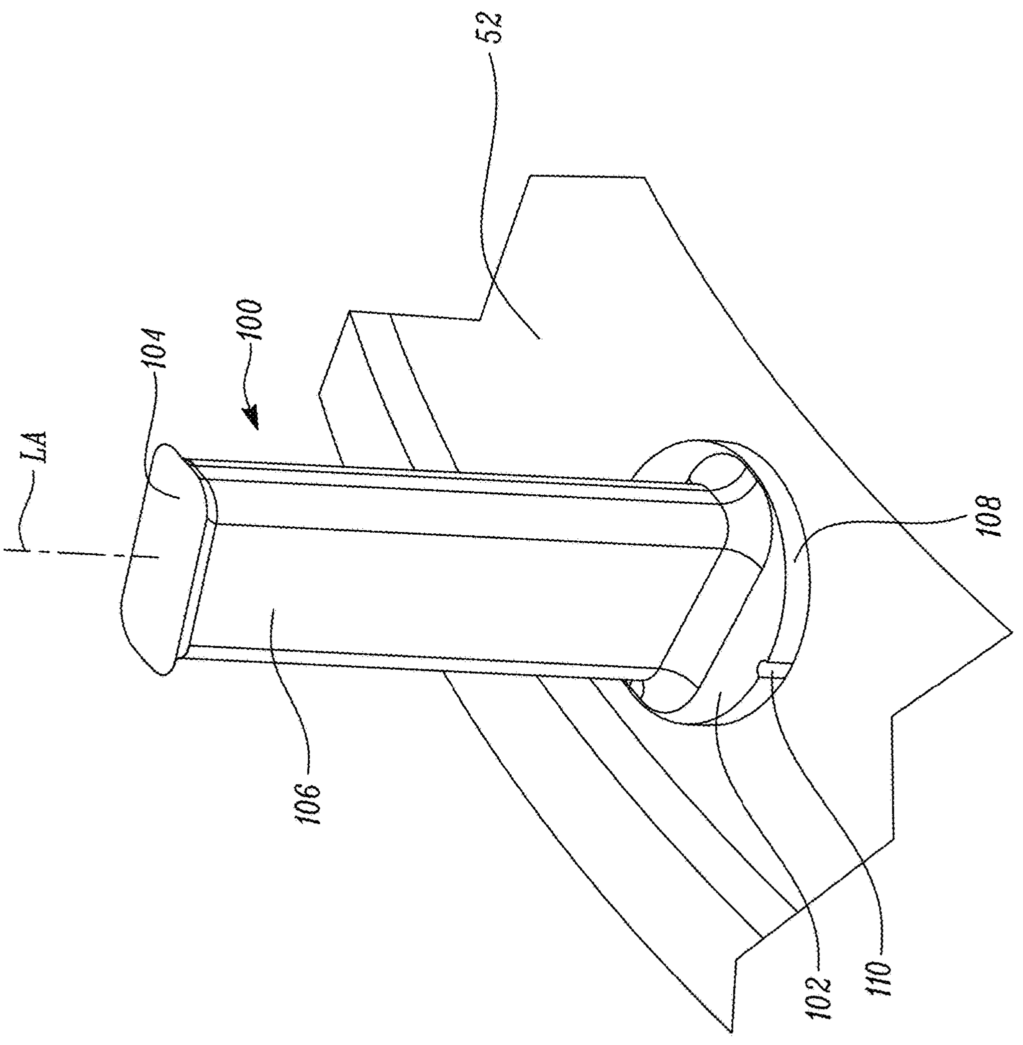
FIG. 4 is a perspective top view of a strut and a first bearing structure of the bearing assembly of FIG. 3.
Figure 5:
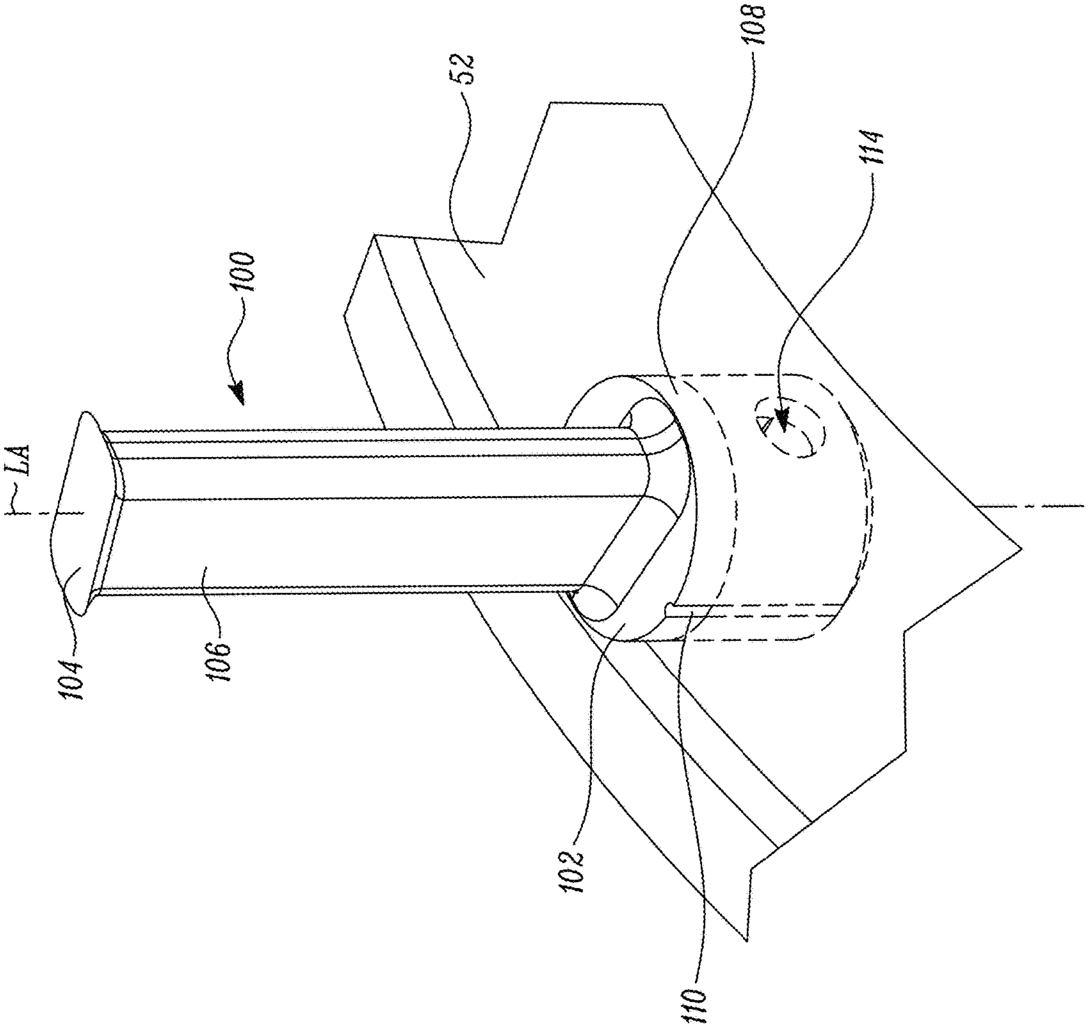
FIG. 5 is a perspective side view of the strut and the first bearing structure of FIG. 4.
Figure 6:
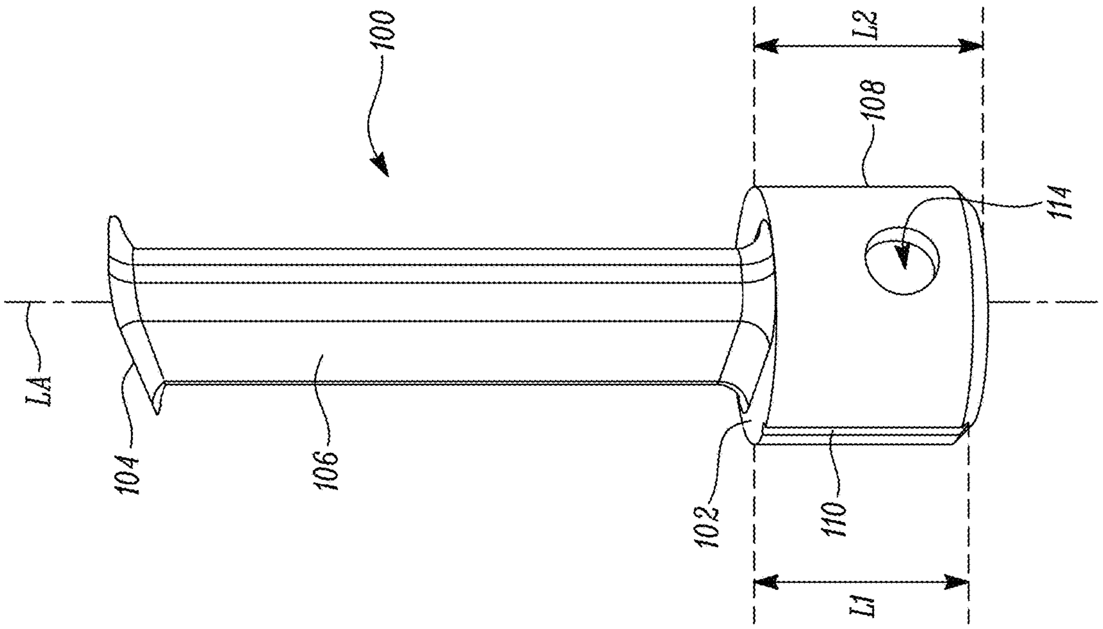
FIG. 6 is a perspective side view of the strut of FIG. 4.
Figure 7:
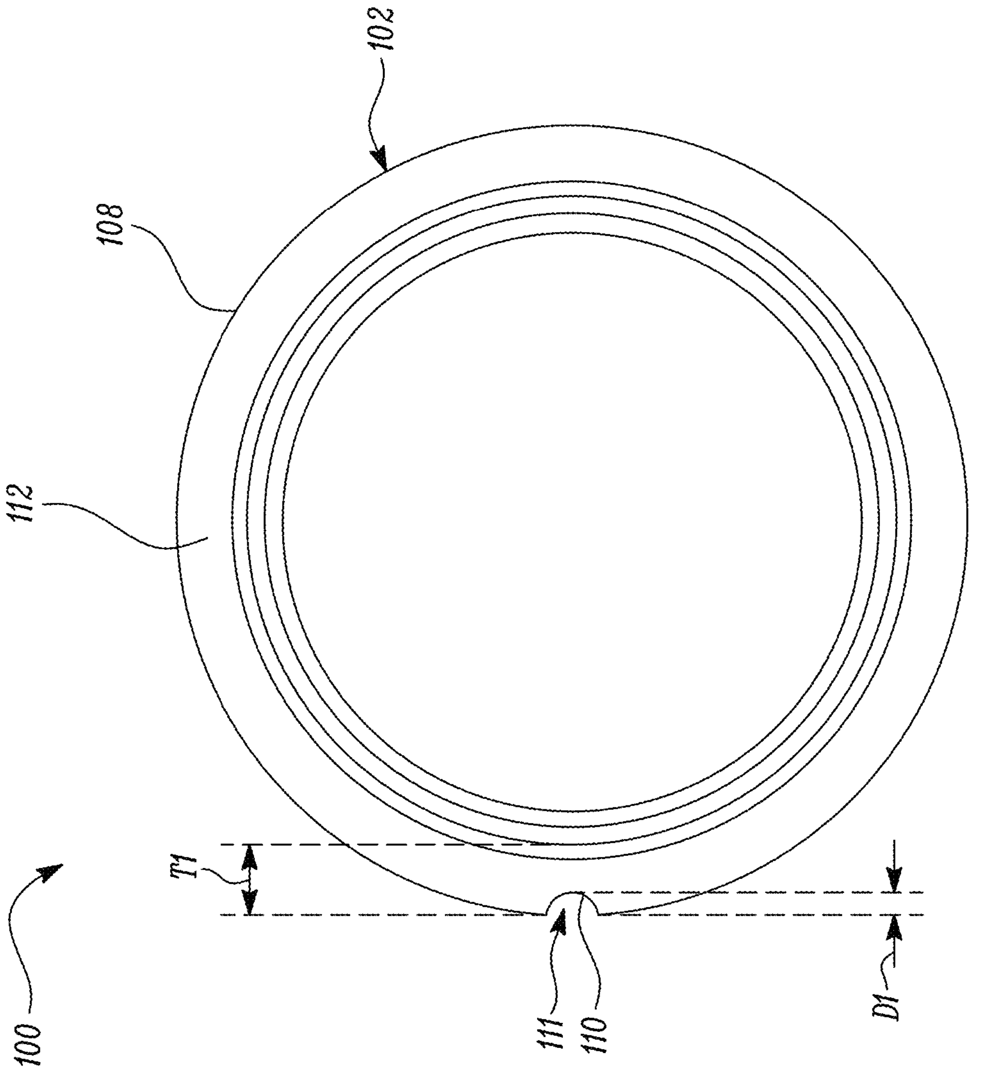
FIG. 7 is a bottom view of the strut of FIG. 4, according to an embodiment of the present disclosure.

FIG. 4 is a perspective top view of the strut 100 and the first bearing structure 52 of the bearing assembly 50 of FIG. 3. FIG. 5 is a perspective side view of the strut 50 and the first bearing structure 52. FIG. 6 is a perspective side view of the strut 100. FIG. 7 is a bottom view of the strut 100.

Referring to FIGS. 2 to 7, the strut 100 includes a first mounting end portion 102, a second mounting end portion 104 spaced apart from the first mounting end portion 102, and a shaft portion 106 extending between the first mounting end portion 102 and the second mounting end portion 104 along a longitudinal axis LA. In FIG. 5, a part of the first mounting end portion 102 is shown as transparent for illustrative purposes.

The first mounting end portion 102 is configured to be attached to the first bearing structure 52 of the bearing assembly 50 thereby forming an interference fit between the first mounting end portion 102 and the first bearing structure 52. The first mounting end portion 102 includes an outer surface 108 forming the interference fit with the first bearing structure 52. The first bearing structure 52 may also include a pin (not shown) that goes through a through hole 114 (shown in FIG. 5) defined on the first mounting end portion 102 thereby retaining the first mounting end portion 102 and the first bearing structure 52 together.

The second mounting end portion 104 is configured to be attached to the second bearing structure 54 of the bearing assembly 50. The second mounting end portion 104 may be attached to the second bearing structure 54 by an interference fit, or by other joining techniques, such as by using fasteners.

The first mounting end portion 102 further includes at least one relief feature 110 formed therein to facilitate the removal of the first mounting end portion 102 from the first bearing structure 52 and thereafter the removal of the second mounting end portion 104 from the second bearing structure 54. In this way, the strut 100 can be removed from the bearing assembly 50 by removing the first mounting end portion 102 from the first bearing structure 52 and then by removing the second mounting end portion 104 from the second bearing structure 54. In some embodiments, the at least one relief feature 110 is disposed on the outer surface 108.

The at least one relief feature 110 disposed on the outer surface 108 of the first mounting end portion 102 may enable removal of the strut 100 from the bearing assembly 50 without affecting or damaging the first bearing structure 52. Specifically, when there is a need to remove a damaged or broken strut (i.e., the strut 100) from the bearing assembly 50, the at least one relief feature 110 may allow the damaged or broken strut to be cut and then drilled out without having to encroach on the first bearing structure 52. In other words, while removing the strut 100 from the bearing assembly 50 by machining, the at least one relief feature 110 may allow the strut 100 to collapse prior to any damage to the first bearing structure 52. The at least one relief feature 110 may further enhance the machining of the strut 100 in such a way that the strut 100 may be removed easily without risk of damage to the first bearing structure 52. Therefore, even though a tight interference fit is present between the first mounting end portion 102 and the first bearing structure 52, the strut 100 may be removed with ease, when required, without damaging the first bearing structure 52.

As the at least one relief feature 110 is disposed on the outer surface 108 of the first mounting end portion 102, the interference fit between the outer surface 108 of the first mounting end portion 102 and the first bearing structure 52 is weakened during the removal of the first mounting end portion 102 from the first bearing structure 52.

In some embodiments, the at least one relief feature 110 has a curved profile 111 (best illustrated in FIG. 7). The curved profile 111 is defined in a plane perpendicular to the longitudinal axis LA. The curved profile 111 of the at least one relief feature 110 may provide a desirable geometry to the at least one relief feature 110 so as to allow easy removal of the strut 100 from the bearing assembly 50 without affecting or damaging the first bearing structure 52. In some embodiments, the curved profile 111 is a circular arc. The circular arc of the curved profile 111 of the at least one relief feature 110 may enhance machining of the strut 100 when the strut 100 is being removed from the bearing assembly 50. The circular arc of the curved profile 111 of the at least one relief feature 110 may be achieved by using a bull nose cutter.

In some embodiments, a length L1 (shown in FIG. 6) of the at least one relief feature 110 along the longitudinal axis LA is substantially equal to a length L2 of the first mounting end portion 102 along the longitudinal axis LA. Such extension of the at least one relief feature 110 across the length of the first mounting end portion 102 may facilitate the removal of the first mounting end portion 102 from the first bearing structure 52 when there is a need to remove the strut 100 from the bearing assembly 50. In other embodiments, the length L1 of the at least one relief feature 110 may be slightly smaller than the length L2 of the first mounting end portion 102.

The first mounting end portion 102 includes a wall 112 having a wall thickness T1 (shown in FIG. 7). The at least one relief feature 110 has a maximum depth D1 (shown in FIG. 7) perpendicular to the longitudinal axis LA. In some embodiments, the maximum depth D1 is at most two-thirds of the wall thickness T1 of the first mounting end portion 102. The maximum depth D1 of the at least one relief feature 110 being at most two-thirds of the wall thickness T1 may ensure that the at least one relief feature 110 does not affect the interference fit between the between the first mounting end portion 102 and the first bearing structure 52.

In the illustrated embodiment of FIG. 7, the at least one relief feature 110 is a single relief feature 110. The single relief feature 110 may be suitable for applications where the interference fit between the first mounting end portion 102 and the first bearing structure 52 is not very tight or strong. In other embodiments, the at least one relief feature 110 may include two or more relief features 110.

Figure 8:
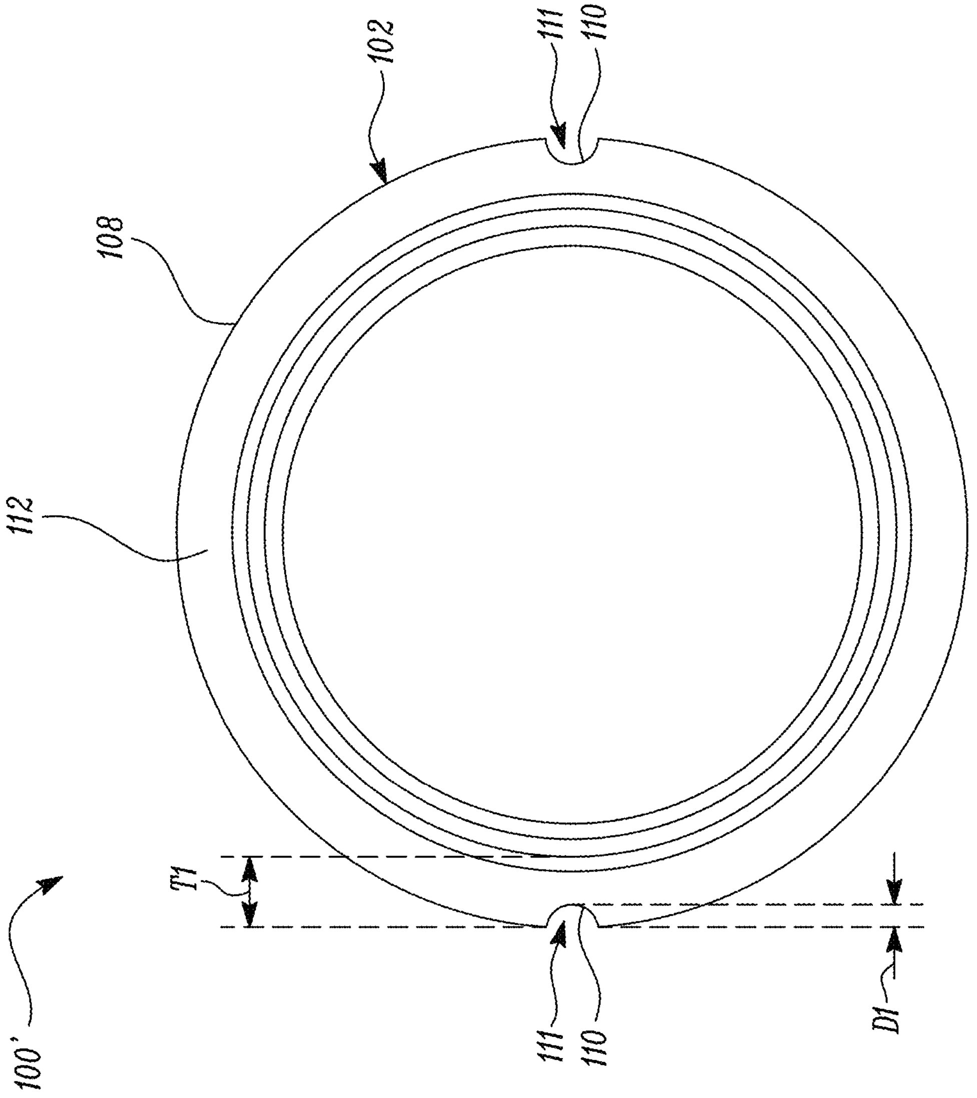
FIG. 8 is a bottom view of a strut, according to another embodiment of the present disclosure.

FIG. 8 is a bottom view of a strut 100', according to another embodiment of the present disclosure. The strut 100' is substantially similar to the strut 100 of FIG. 7. A functional advantage of the strut 100' is the same as that of the strut 100. However, in the strut 100', the at least one relief feature 110 includes a pair of diametrically opposite relief features 110. The pair of diametrically opposite relief features 110 may be suitable for applications where the interference fit between the first mounting end portion 102 and the first bearing structure 52 is very tight or strong.

Figure 9:
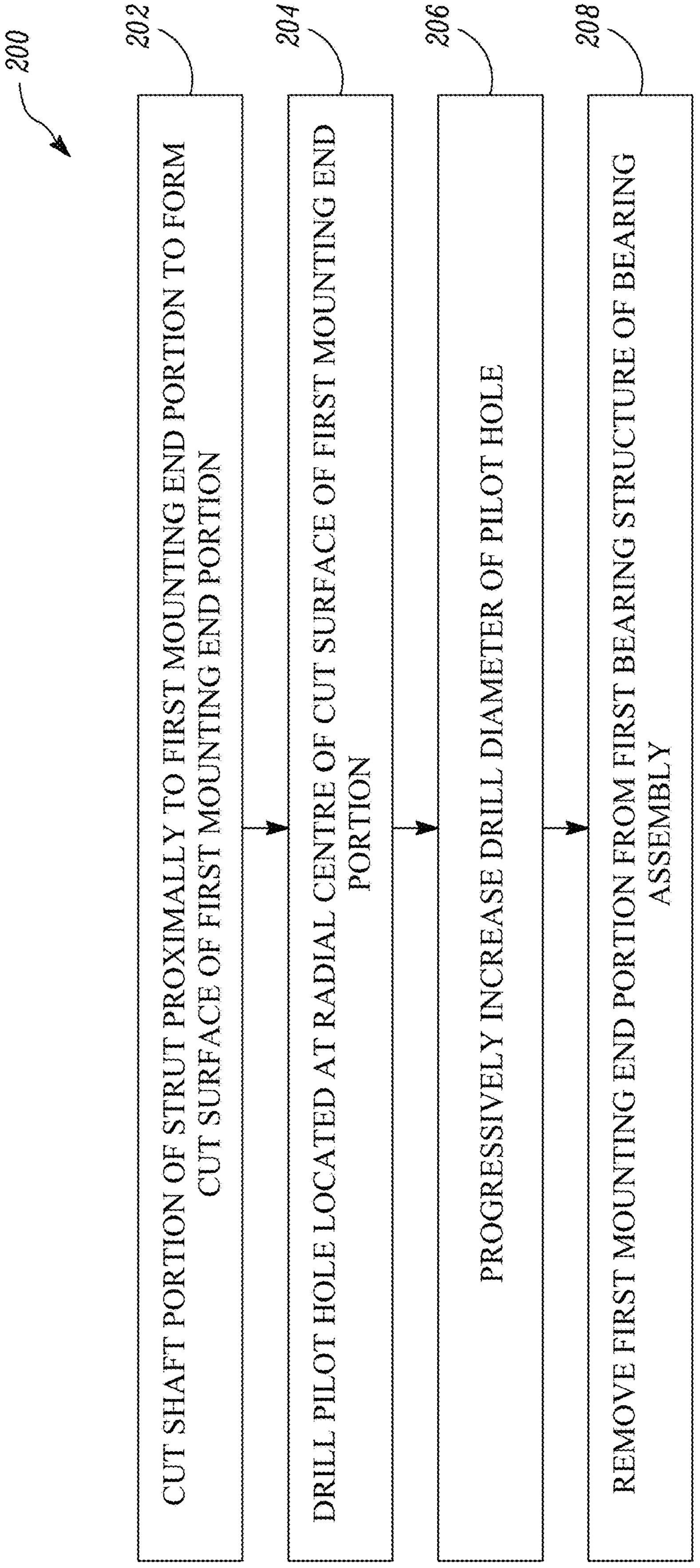
FIG. 9 is a flowchart of a method for removing the strut from the bearing assembly of FIG. 3.
Figure 10:
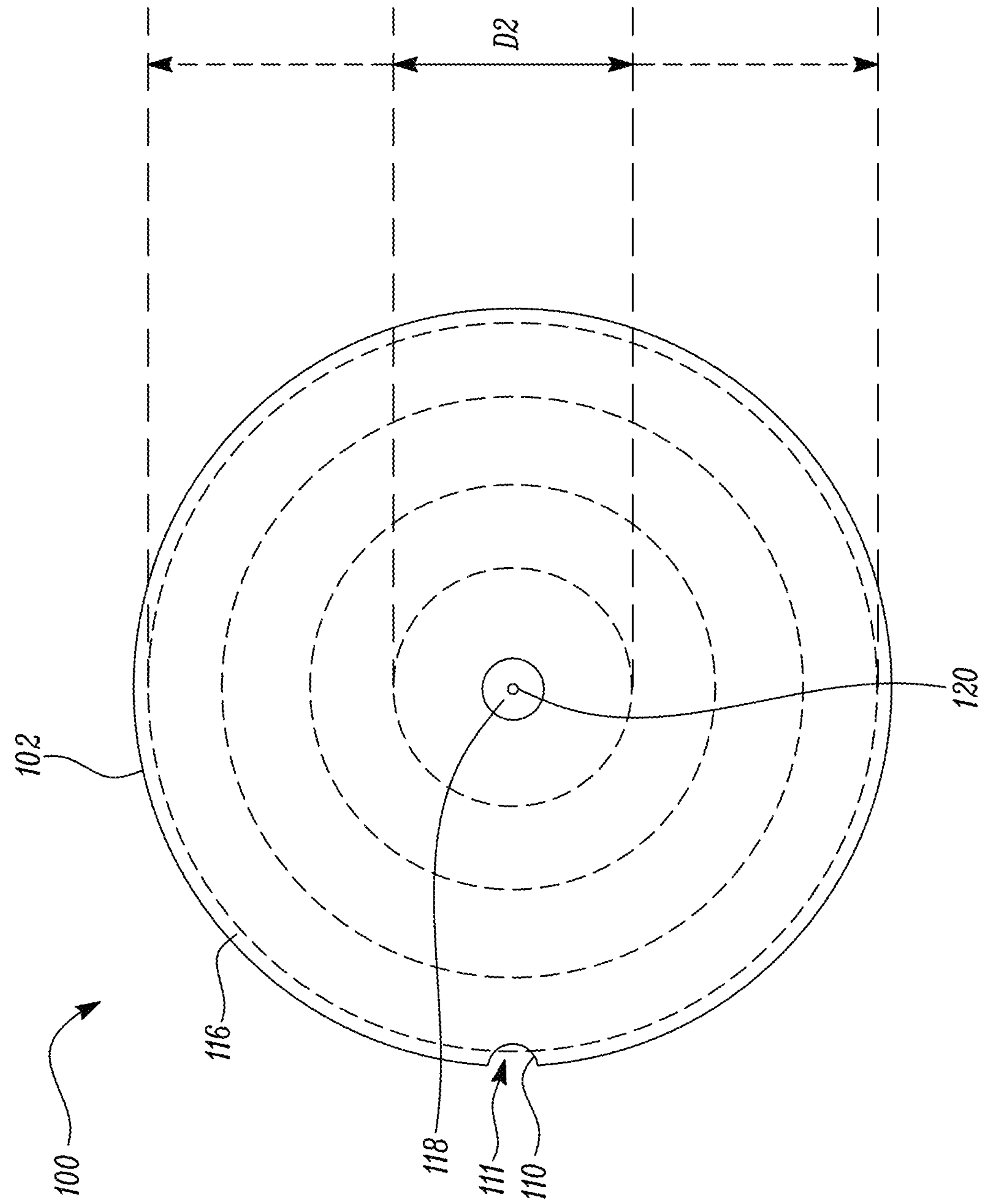
FIG. 10 is a sectional top view of the strut of FIG. 4 during removal of the strut from the bearing assembly of FIG. 3 by the method depicted in FIG. 9.

FIG. 9 is a flowchart of a method 200 for removing the strut 100 from the bearing assembly 50 of FIG. 3. FIG. 10 is a sectional top view of the strut 100 of FIG. 4 during removal of the strut 100 from the bearing assembly 50 of FIG. 3 by the method 200 depicted in FIG. 9.

Referring to FIGS. 2 to 10, at step 202, the method 200 includes cutting the shaft portion 106 of the strut 100 proximally to the first mounting end portion 102 to form a cut surface 116 of the first mounting end portion 102. At step 204, the method 200 further includes drilling a pilot hole 118 located at the radial centre 120 of the cut surface 116 of the first mounting end portion 102. At step 206, the method 200 further includes progressively increasing a drill diameter D2 of the pilot hole 118 until the drill diameter D2 of the pilot hole 118 breaks through the at least one relief feature 110. At step 208, the method 200 further includes removing the first mounting end portion 102 from the first bearing structure 52 of the bearing assembly 50. The method 200 further includes removing the second mounting end portion 104 from the second bearing structure 54 after removal of the first mounting end portion 102 from the first bearing structure 52.

As the drill diameter D2 of the pilot hole 118 breaks through the at least one relief feature 110, the first mounting end portion 102 of the strut 100 may be easily removed from the first bearing structure 52 of the bearing assembly 50. It means that the method 200 of the present disclosure provides an easy and efficient technique for removing the first mounting end portion 102 of the strut 100 from the first bearing structure 52 without affecting or damaging the first bearing structure 52. Further, the method 200 is advantageous due to inclusion of the at least one relief feature 110 on the first mounting end portion 102 of the strut 100.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A strut for a bearing assembly of a gas turbine engine, the bearing assembly having a first bearing structure and a second bearing structure, the strut comprising:

a first mounting end portion, a second mounting end portion spaced apart from the first mounting end portion, and a shaft portion extending between the first mounting end portion and the second mounting end portion along a longitudinal axis;

wherein the first mounting end portion is configured to be attached to the first bearing structure of the bearing assembly thereby forming an interference fit between the first mounting end portion and the first bearing structure;

the second mounting end portion is configured to be attached to the second bearing structure of the bearing assembly;

the first mounting end portion includes at least one relief feature formed therein to facilitate the removal of the first mounting end portion from the first bearing structure and thereafter the removal of the second mounting end portion from the second bearing structure; and a length of the at least one relief feature along the longitudinal axis is substantially equal to a length of the first mounting end portion along the longitudinal axis.

2. The strut of claim 1, wherein the first mounting end portion includes an outer surface forming the interference fit with the first bearing structure, and wherein the at least one relief feature is disposed on the outer surface.

3. The strut of claim 1, wherein the first mounting end portion includes a wall having a wall thickness, wherein the at least one relief feature has a maximum depth perpendicular to the longitudinal axis, and wherein the maximum depth is at most two-thirds of the wall thickness of the first mounting end portion.

4. The strut of claim 1, wherein the at least one relief feature has a curved profile.

5. The strut of claim 4, wherein the curved profile is a circular arc.

6. The strut of claim 1, wherein the at least one relief feature is a single relief feature.

7. The strut of claim 1, wherein the at least one relief feature includes a pair of diametrically opposite relief features.

8. A bearing assembly for a gas turbine engine, the bearing assembly comprising:

a first bearing structure;

a second bearing structure spaced apart from the first bearing structure; and a strut of claim 1, wherein the first mounting end portion is attached to the first bearing structure thereby forming an interference fit between the first mounting end portion and the first bearing structure, and wherein the second mounting end portion is attached to the second bearing structure.

9. A gas turbine engine including the bearing assembly of claim 8.

10. A method for removing a strut from a bearing assembly, the bearing assembly having a first bearing structure and a second bearing structure, the strut comprising:

a first mounting end portion, a second mounting end portion spaced apart from the first mounting end portion, and a shaft portion extending between the first mounting end portion and the second mounting end portion along a longitudinal axis;

wherein the first mounting end portion is configured to be attached to the first bearing structure of the bearing assembly thereby forming an interference fit between the first mounting end portion and the first bearing structure;

the second mounting end portion is configured to be attached to the second bearing structure of the bearing assembly; and the first mounting end portion includes at least one relief feature formed therein to facilitate the removal of the first mounting end portion from the first bearing structure and thereafter the removal of the second mounting end portion from the second bearing structure;

the method comprising the steps of:

cutting the shaft portion of the strut proximally to the first mounting end portion to form a cut surface of the first mounting end portion;

drilling a pilot hole located at the radial center of the cut surface of the first mounting end portion;

progressively increasing a drill diameter of the pilot hole until the drill diameter of the pilot hole breaks through the at least one relief feature; and removing the first mounting end portion from the first bearing structure of the bearing assembly.

11. The method of claim 10, further comprising removing the second mounting end portion from the second bearing structure after removal of the first mounting end portion from the first bearing structure.

* * * * *